United States Patent
Li

(10) Patent No.: US 12,118,713 B2
(45) Date of Patent: Oct. 15, 2024

(54) SYSTEM OF AUTOMATICALLY MONITORING ELECTRONIC BILLBOARD TO IMMEDIATELY RESPONDING PRODUCTION ABNORMALITY AND METHOD THEREOF

(71) Applicants: Inventec (Pudong) Technology Corporation, Shanghai (CN); Inventec Corporation, Taipei (TW)

(72) Inventor: Jian-Ming Li, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 424 days.

(21) Appl. No.: 17/554,367

(22) Filed: Dec. 17, 2021

(65) Prior Publication Data
US 2023/0169639 A1    Jun. 1, 2023

(30) Foreign Application Priority Data
Nov. 29, 2021    (CN) .......................... 202111431569.X

(51) Int. Cl.
*G06T 7/00*    (2017.01)

(52) U.S. Cl.
CPC .... *G06T 7/001* (2013.01); *G06T 2207/30121* (2013.01)

(58) Field of Classification Search
CPC .. G06T 7/00; G06T 7/001; G06T 7/10; G06T 3/10; G06T 3/14; G06T 2207/20104; G06T 2207/30121
See application file for complete search history.

(56) References Cited

U.S. PATENT DOCUMENTS

| 2004/0218804 | A1* | 11/2004 | Affleck | G02B 21/0016 |
| | | | | 382/141 |
| 2014/0363143 | A1* | 12/2014 | Dharssi | H04N 21/854 |
| | | | | 386/282 |
| 2019/0164576 | A1* | 5/2019 | Lee | G06F 11/1438 |
| 2019/0227510 | A1* | 7/2019 | Hoggatt | G06Q 30/0272 |

FOREIGN PATENT DOCUMENTS

WO    WO-2021095351 A1 *    5/2021    .......... G06T 7/0002

* cited by examiner

*Primary Examiner* — Edward F Urban
*Assistant Examiner* — Duy Tran
(74) *Attorney, Agent, or Firm* — David R. Stevens; Stevens Law Group

(57) ABSTRACT

A system of automatically monitoring an electronic billboard to immediately responding a production abnormality and a method thereof are disclosed. In the system, a monitoring device performs an image pattern analysis on a monitoring image to analyze at least one analysis area, and captures the at least one analysis area as a to-be-analyzed image; at least one image analysis method is set to transform the to-be-analyzed image into an image characteristic according to an image pattern of the to-be-analyzed image. When a comparison between the image characteristic and a preset characteristic indicates an abnormality, a monitoring device generates, records and transmits a warning message and/or issues an alarm, thereby achieving the technical effect of automatically monitoring the electronic billboard and immediately responding a production abnormality.

4 Claims, 6 Drawing Sheets

SYSTEM OF AUTOMATICALLY MONITORING ELECTRONIC BILLBOARD TO IMMEDIATELY RESPONDING PRODUCTION ABNORMALITY AND METHOD THEREOF

CROSS-REFERENCE TO RELATED APPLICATION

This application claims the benefit of Chinese Application Serial No. 202111431569.X, filed Nov. 29, 2021, which is hereby incorporated herein by reference in its entirety.

BACKGROUND OF THE INVENTION

1. Field of the Invention

The present invention is related to a monitoring and immediately responding system and a method thereof, and more particularly to a system capable of performing an image pattern analysis on a to-be-analyzed image, setting an image analysis method corresponding to an image pattern of the to-be-analyzed image and using a monitoring device to immediately responding when the image characteristic indicates abnormality, and a method thereof.

2. Description of the Related Art

With the development of computer technology, the visualization method using an electronic billboard to monitor the production process has become a common method in enterprise production field. The visualization method of using the electronic billboard can efficiently assist producers and managers to conveniently collect production information and save communication and management cost in real time, and can also help the producers and managers discover production abnormalities in real time during the production process and reduce abnormal handling time, thereby reducing business losses.

However, it is not realistic to manually monitor the electronic billboard all day. On the one hand, arranging dedicated people on duty will increase cost; on the other hand, because people may be affected by fatigue, the tired people are easy to cause misjudgments and omissions in the process of monitoring the electronic billboard.

Therefore, what is needed is to develop an improved solution to solve the above-mentioned problem that monitoring the electronic billboard manually is easy to cause misjudgments and omissions.

SUMMARY OF THE INVENTION

An objective of the present invention is to provide an electronic billboard system for automatic monitoring and immediate production of abnormal response and a method thereof, so as to solve the conventional technology problem that monitoring the electronic billboard manually is easy to cause misjudgments and omissions.

In order to achieve the objective, the present invention discloses a system of automatically monitoring an electronic billboard to immediately respond a production abnormality; the system is adapted to an electronic billboard displaying monitoring information and includes a monitoring device, and the monitoring device includes an image capturing module, an area selection module, an analysis method setting module, an image analysis module, a generation module and a warning module.

The monitoring device is interconnected to the electronic billboard. The image capturing module is configured to capture a monitoring image from the monitoring information. The area selection module is configured to perform an image pattern analysis on the monitoring image, to analyze at least one analysis area corresponding to an image pattern in the monitoring image and capture the at least one analysis area as at least one to-be-analyzed image. The analysis method setting module is configured to set at least one image analysis method according to the image pattern of the to-be-analyzed image. The image analysis module is configured to transform the at least one to-be-analyzed image into an image characteristic, according to the at least one image analysis method. When comparison between the image characteristic and a preset characteristic indicates an abnormality, the generation module generates a warning message. When the generation module generates the warning message, the warning module records the warning message and transmit the warning message or issue an alarm.

In order to achieve the objective, the present invention discloses a method of automatically monitoring an electronic billboard to immediately respond a production abnormality; the method is adapted to an electronic billboard displaying monitoring information and includes steps of: interconnecting a monitoring device to the electronic billboard; capturing a monitoring image from the monitoring information, by the monitoring device; performing an image pattern analysis on the monitoring image, and analyzing at least one analysis area corresponding to an image pattern in the monitoring image, and capturing the at least one analysis area as at least one to-be-analyzed image, by the monitoring device; setting at least one image analysis method according to the image pattern of the to-be-analyzed image, by the monitoring device; transforming the at least one to-be-analyzed image into an image characteristic according to the at least one image analysis method, by the monitoring device; when comparison between the image characteristic and a preset characteristic indicates an abnormality, generating a warning message by the monitoring device; and when the monitoring device generates the warning message, recording a warning message, and transmitting the warning message or issuing an alarm, by the monitoring device.

According to the above-mentioned system and method of the present invention, the difference between the present invention and the conventional technology is that, in the present invention, the monitoring device performs the image pattern analysis on the monitoring image to analyze the at least one analysis area, and captures the at least one analysis area as the to-be-analyzed image; the at least one image analysis method is set to transform the to-be-analyzed image into the image characteristic according to the image pattern of the to-be-analyzed image; when the comparison between the image characteristic and the preset characteristic indicates an abnormality, the monitoring device generates, records and transmits the warning message and/or issues the alarm.

Therefore, the above-mentioned solution of the present invention is able to achieve the technical effect of automatically monitoring the electronic billboard and immediately responding a production abnormality.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
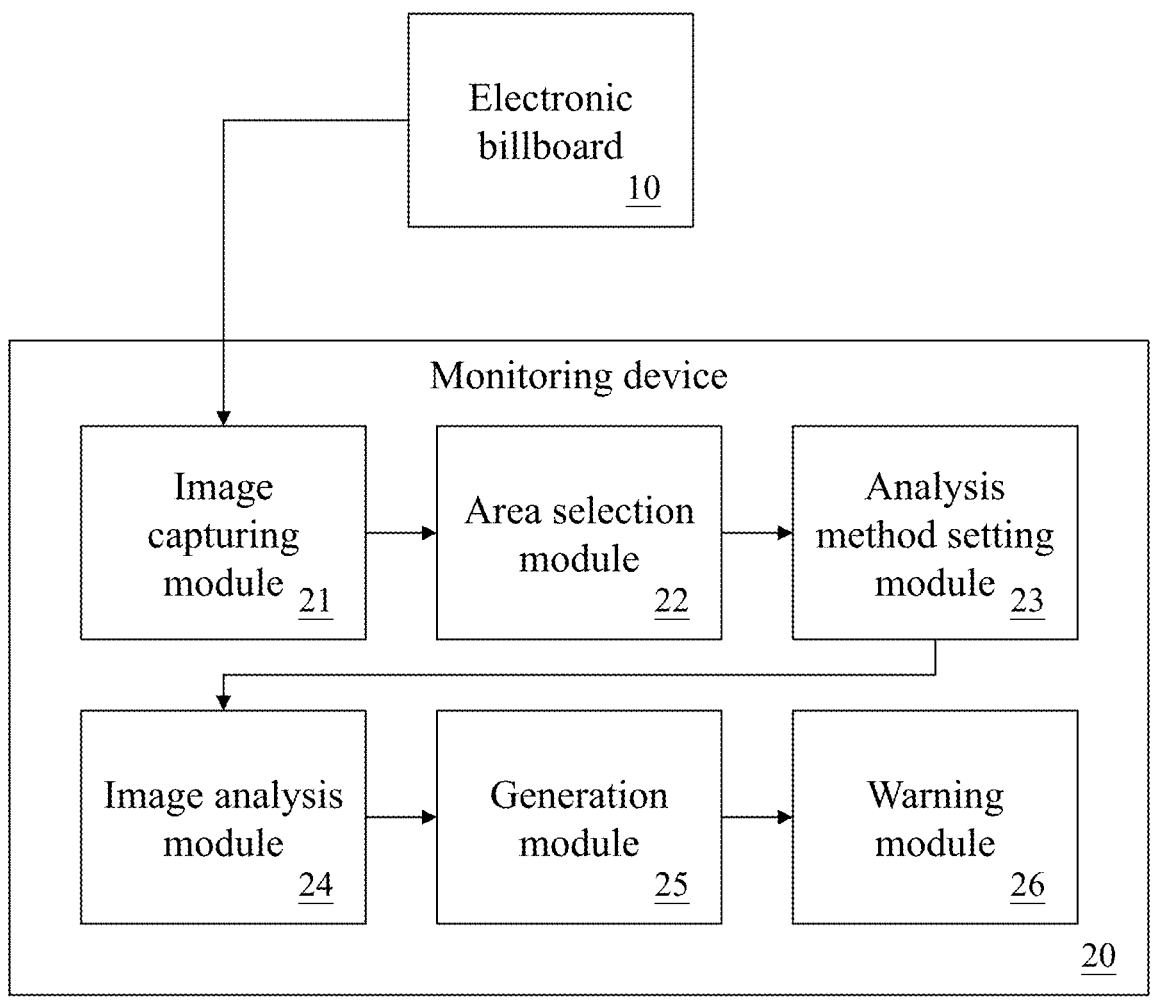
FIG. 1 is a system block diagram of a system of automatically monitoring an electronic billboard to immediately respond a production abnormality, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The electronic billboard system for automatic monitoring and immediate production of abnormal response of the present invention will be described in the following paragraphs. Please refer to FIG. 1, which is a system block diagram of an electronic billboard system for automatic monitoring and immediate production of abnormal response, according to the present invention.

The system of the present invention is adapted to an electronic billboard 10 displaying monitoring information and includes a monitoring device 20 includes an image capturing module 21, an area selection module 22, an analysis method setting module 23, an image analysis module 24, a generation module 25 and a warning module 26.

The electronic billboard 10 is configured to display the monitoring information which is set to be monitored, for example, the monitoring information can be presented as a histogram, a line chart, a table or a color label array. In an embodiment, the electronic billboard 10 can display the monitoring information in a video form, or the electronic billboard 10 can display the monitoring information in an image form and periodically update the monitoring information in the image form; however, these examples are merely for exemplary illustration, and the application field of the present invention is not limited to these examples.

The monitoring device 20 and the electronic billboard 10 can be interconnected through a wired transmission manner or a wireless transmission manner; for example, the wired transmission manner can be a power line network or an optical network; the wireless transmission manner can be Wi-Fi, mobile communication network (such as 3G, 4G, or 5G). However, these examples are merely for exemplary illustration, and the application field of the present invention is not limited to these examples.

Figure 2:
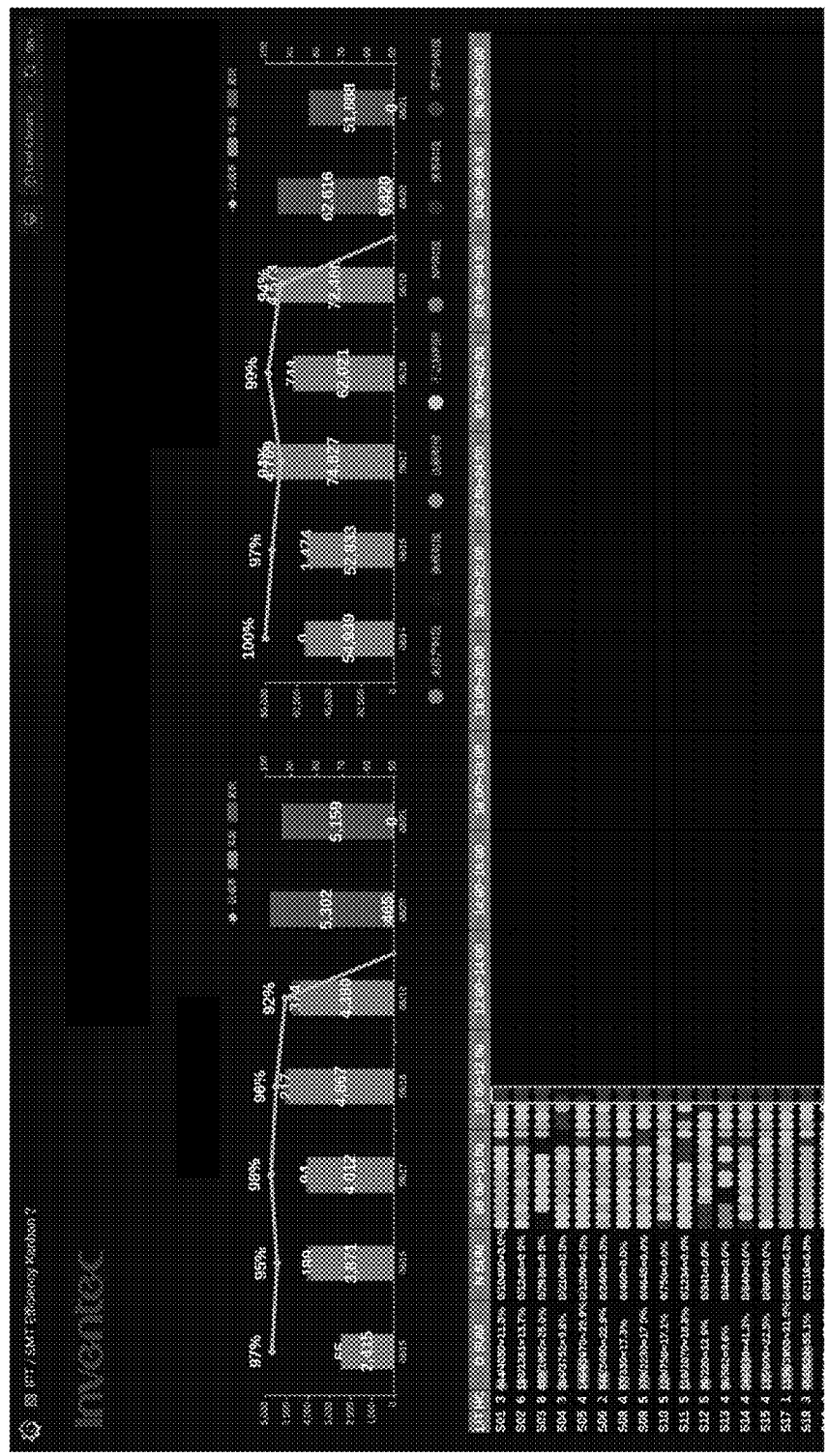
FIG. 2 is a schematic view of a monitoring image used in a system of automatically monitoring an electronic billboard to immediately responding a production abnormality, according to the present invention.

Please refer to FIG. 2, which is a schematic view of a monitoring image which is automatically monitored by an electronic billboard for immediately responding production abnormality, according to the present invention. In FIG. 2, the image capturing module 21 of the monitoring device 20 can capture a monitoring image 41 from the monitoring information. For example, in a condition that the monitoring information is in the video form, the image capturing module 21 of the monitoring device 20 can capture an image from the video and used the captured image as the monitoring image 41; in a condition that the monitoring information is in the image form, the image capturing module 21 of the monitoring device 20 can receive the image from the electronic billboard 10 and use the received image as the monitoring image 41.

Figure 3:
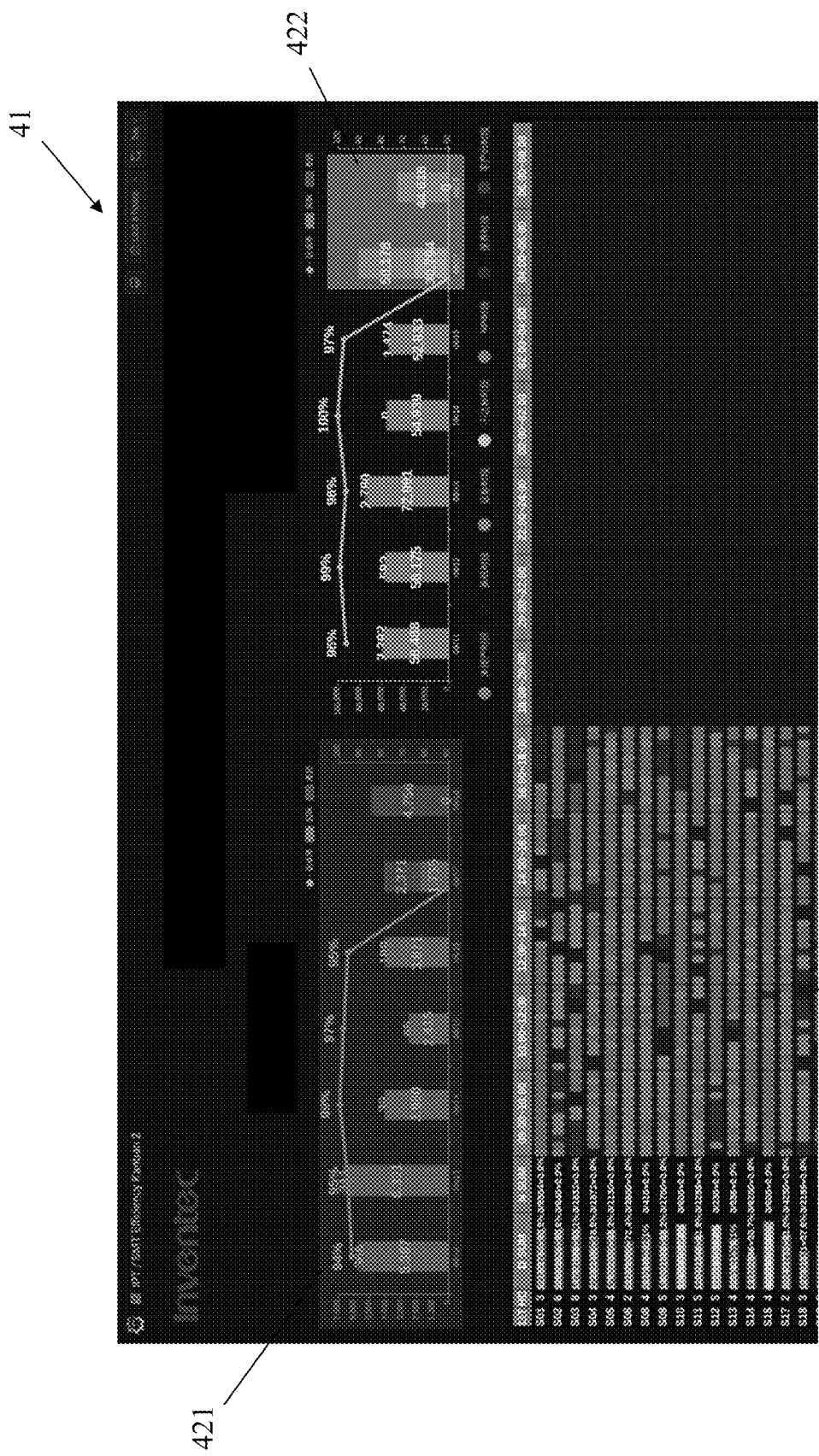
FIG. 3 illustrates a schematic view of an analysis area used in a system of automatically monitoring an electronic billboard to immediately respond a production abnormality, according to the present invention.
Figure 4A:
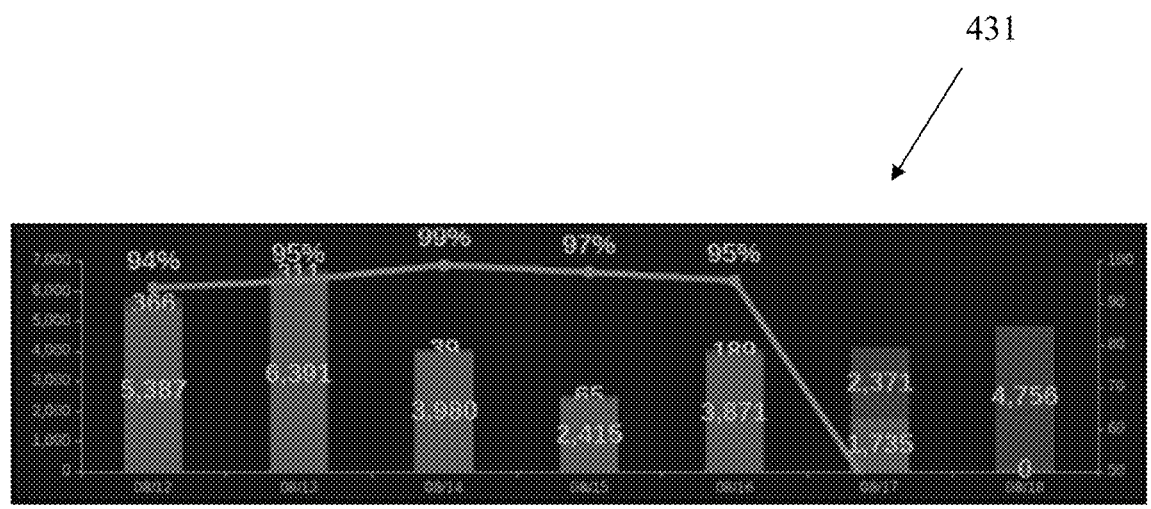
FIG. 4A to 4C are schematic views of analyzed images used in a system of automatically monitoring an electronic billboard to immediately respond a production abnormality, according to the present invention.
Figure 4B:
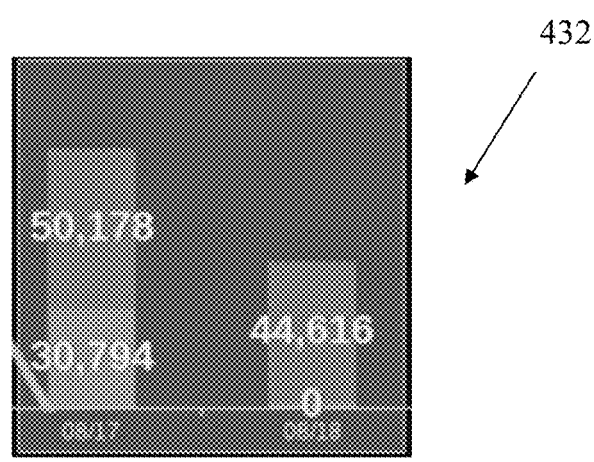
Figure 4C:
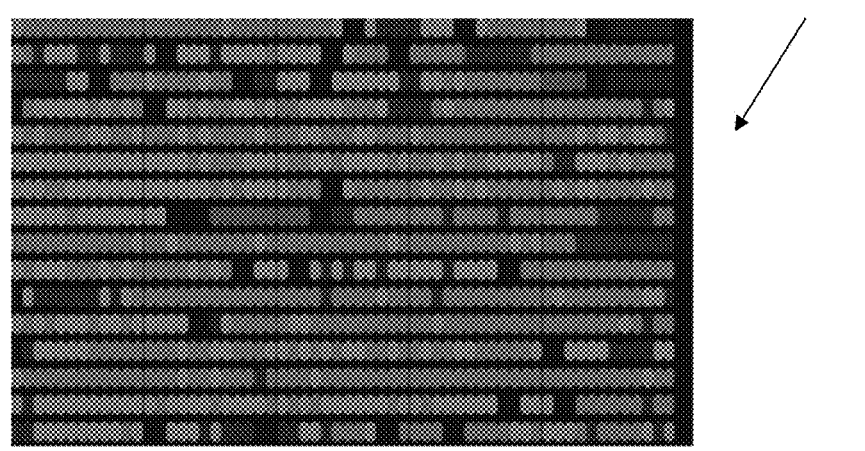

Please refer to FIG. 3, which is a schematic view of an analysis area which is automatically monitored by an electronic billboard for immediately responding production abnormality, according to the present invention. After the image capturing module 21 of the monitoring device 20 captures the monitoring image 41 from the monitoring information, the area selection module 22 of the monitoring device 20 performs an image pattern analysis on the monitoring image 41. The image pattern can be, for example, a histogram, a line chart or a color label array. The histogram has image characteristics of rectangular blocks, horizontal axis and vertical axis, the line chart has image characteristics of turning points, line sections, horizontal axis and vertical axis, and the color label array has image characteristics of color labels arranged in array. The area selection module 22 of the monitoring device 20 performs the image pattern analysis on the monitoring image 41 according to aforementioned image characteristics; for example, as shown in FIG. 3, in the monitoring image 41, the area selection module 22 can analyze and select a first analysis area 421 corresponding to the image patterns of the histogram and the line chart, and analyze and select a second analysis area 422 corresponding to the image pattern of the histogram, and analyze and select a third analysis area 423 corresponding to the image pattern of the color label array, so that the he area selection module 22 can capture the first analysis area 421, the second analysis area 422 and the third analysis area 423 from the monitoring image 41 as a first to-be-analyzed image 431, a second to-be-analyzed image 432 and a third to-be-analyzed image 433, respectively; however, these examples are merely for exemplary illustration, and the application field of the present invention is not limited to these examples. FIG. 4A to 4C shows the first to-be-analyzed image 431, the second to-be-analyzed image 432 and the third to-be-analyzed image 433, respectively.

The analysis method setting module 23 of the monitoring device 20 can set at least one image analysis method according to the image patterns corresponding to the first to-be-analyzed image 431, the second to-be-analyzed image 432, and the third to-be-analyzed image 433. It should be noted that the image analysis method can be prebuilt in the monitoring device 20, or the image analysis method can be a calculation service provided to the monitoring device 20 by an external server; the image analysis method can be expanded or updated in the monitoring device 20 or the external server, so as to provide more diversified image analysis method.

Particularly, the analysis method setting module 23 of the monitoring device 20 can set the image analysis method as "match_historgram" for the first to-be-analyzed image 431 when the image pattern of the first to-be-analyzed image 431 includes a histogram and a line chart, and set the image analysis method as "match_cluster" for the first to-be-analyzed image 432 when the image pattern of the second to-be-analyzed image 432 includes a histogram, and set the image analysis method as "match_template" for the first to-be-analyzed image 433 when the image pattern of the first to-be-analyzed image 433 includes a color label array; however, these examples are merely for exemplary illustration, and the application field of the present invention is not limited to these examples.

After the analysis method setting module 23 of the monitoring device 20 analyzes the image patterns contained in the first to-be-analyzed image 431, the second to-be-analyzed image 432 and the third to-be-analyzed image 433 and sets the image analysis methods corresponding to the analyzed image patterns, the image analysis module 24 of the monitoring device 20 transforms the at least one to-be-analyzed image into image characteristic by the at least one image analysis method, for example, the image analysis module 24 transforms the first to-be-analyzed image 431, the second to-be-analyzed image 432 and the third to-be-analyzed image 433.

Figure 5A:
FIGS. 5A and 5B are schematic views of abnormality templates used in the present invention.
Figure 5B:
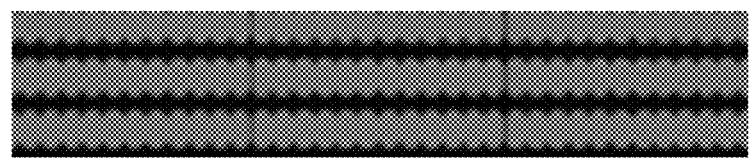

Particularly, the analysis process performed on the third to-be-analyzed image 433 based on the image analysis method set as "match_template" is described as following:
a first abnormality template 511 and a second abnormality template 512 are prebuilt, as shown in FIGS. 5A and 5B, which are the prebuilt first abnormality template 511 and second abnormality template 512 according to the present invention. A similarity comparison is performed on the third to-be-analyzed image 433 by moving the first abnormality template 511 and the second abnormality template 512 to calculate a difference step-by-step in an order from top to bottom and from left to right, and a similarity of the third to-be-analyzed image 433 can be calculated by means of mean square error (MSE), and the similarity of the third to-be-analyzed image 433 is used as an image characteristic transformed from the third to-be-analyzed image 433, and the calculation of mean square error is expressed as the following equation, $$R(x, y) = \frac{\sum_{k',y'} (T(x', y') - I(x+x', y+y'))^2}{\sqrt{\sum_{k',y'} T(x', y')^2 \sum_{k',y'} I(x+x', y+y')^2}}$$

wherein T indicates the first abnormality template 511 or the second abnormality template 512, I indicates the third to-be-analyzed image 433, R indicates a similarity function of the third to-be-analyzed image 433 and one of the first abnormality template 511 and the second abnormality template 512, (x,y) indicates an array unit, (x',y') indicates a moving process variable, and the calculated R more approaching 1 indicates that the third to-be-analyzed image 433 is more similar to the first abnormality template 511 or the second abnormality template 512.

Particularly, the analysis process performed on the first to-be-analyzed image 431 based on the image analysis method set as "match_historgram" is described as following.

Each pixel of the first to-be-analyzed image 431 has a matrix of [B,G,R], and the [B,G,R] indicates a blue value, a green value and a red value commonly used in image process. Transforming the first to-be-analyzed image 431 into a grayscale image from a color image is to transform the matrix of [B,G,R] to one grayscale value, and a ratio of an average grayscale value of the first to-be-analyzed image 431 to a normal grayscale value or an abnormal grayscale value can be used as the transformed image characteristic of the first to-be-analyzed image 431.

particularly, the analysis process performed on the second to-be-analyzed image 432 based on the image analysis method set as "match_cluster" is described as following.

The second to-be-analyzed image 432 is transformed into a grayscale image, and an image characteristic calculation is performed on the transformed grayscale image of the second to-be-analyzed image 432 by means of histogram of oriented gradient (HOG).

The histogram of oriented gradient (HOG) is to divide the transformed grayscale image of the sample image of each category of into cells linked with each other, and extract the histogram of oriented gradient (HOG) of gradients or edges of pixels in each cell, and use a sum of the all HOGs as the image characteristic of the second to-be-analyzed image 432.

in other embodiment of the histogram of oriented gradient (HOG), the above-mentioned cell can be expanded to a block, a density of the histogram within the block is calculated, and histogram of each cell is normalized based on the density of the block, and the sum of the normalized HOGs of the cells is used as the image characteristic of the second to-be-analyzed image 432.

when the comparison between the image characteristic and a preset characteristic indicates an abnormality, the generation module 25 of the monitoring device 20 generates a warning message. Particularly, in a condition that the image analysis methods are set as "matchflistorgram" and "match_template", the image characteristic of the third to-be-analyzed image 433 and the image characteristic of the first to-be-analyzed image 431 can be directly calculated, and when the comparison between the calculated image characteristic and the preset characteristic indicates an abnormality, the generation module 25 generates a warning message.

In a condition that the image analysis method is set as "match_cluster", sample images of categories including "bad", "good" and "modest" are prebuilt, for example, 10 sample images are prebuilt for each category, and different category indicate different abnormality degree. The sample images of each category are transformed into the grayscale images, and image characteristic calculation is performed on each grayscale image, which is transformed from the sample image of the category, by the means of HOG; the calculation of the image characteristic is similar to the above-mentioned description, so the detailed description is not repeated herein.

The image characteristics of the same category are clustered, and a cluster center of the image characteristics of the same category is a sample image prototype of the category. A distance from an image characteristic of the second to-be-analyzed image 432 to selected one of the sample image prototypes, when the distance is lower than or equal to a preset threshold value, the image characteristic of the second to-be-analyzed image 432 is belonged to the category corresponding to the selected sample image prototype.

In addition, the image characteristic of the sample image of each of the categories "good" and "modest" can set with a characteristic flag of 0, and the image characteristic of the sample image of the category "bad" can be set with a characteristic flag of 1, the characteristic flags of the sample images can be used to train a support vector machine (SVM), and the image characteristic of the second to-be-analyzed image 432 can be inputted into the well-trained support vector machine, and when the output of the support vector machine is o, it indicates that the image characteristic of the second to-be-analyzed image 432 is belonged to the category "good" or "modest"; when the output of the support vector machine is 1, it indicates that the image characteristic of the second to-be-analyzed image 432 is belonged into the category "bad". When the image characteristic of the second to-be-analyzed image 432 is determined to belong into the category "bad", it indicates that the image characteristic is abnormal compared with the preset characteristic, so the generation module 25 of the monitoring device 20 generates the warning message.

The image analysis module 24 and the generation module 25 can flexibly apply various image analysis methods, for example, the image analysis method can combine computer vision technology with artificial characteristic extraction and deep learning characteristic extraction methods according to the actual situation to perform characteristic extraction, and then combine with statistical analysis methods (for example, the abnormality is determined according to the distribution), supervised learning methods (for example: labelled training models for abnormality categories), or unsupervised learning methods (for example, the normal sample pattern is learned according to the distribution of samples) according to the actual situation, so as to achieve a good detection effect.

When the generation module 25 of the monitoring device 20 generates the warning message, the warning module 26 records the warning message and transmits the warning message, and/or issue an alarm. The warning module 26 of the monitoring device 20 can transmit the warning message through manner of email or SMS, the warning module 26 of the monitoring device 20 can output an alarm voice through a voice manner, or make an alarm sound through sound manner; however, these examples are merely for exemplary illustration, and the application field of the present invention is not limited to these examples.

The warning module 26 of the monitoring device 20 can transmit the warning message and/or issue the alarm according to a warning policy, and particular operation is described in the following paragraphs.

When the types of the warning messages generated by the same electronic billboard 10 within a specific time period (such as 5 minutes or 10 minutes) are similar to each other, the warning module 26 of the monitoring device 20 transmits the warning message or issue the alarm at most twice; when different electronic billboards 10 generates the warning message by the same image analysis method within specific time period (such as 5 minutes or 10 minutes), the warning module 26 of the monitoring device 20 transmits the warning message or issue alarm at most twice; when the types of the warning messages generated by the same electronic billboard 10 within a specific time period (such as one hour or two hours) are similar to each other, the warning module 26 of the monitoring device 20 transmits the warning message or issue the alarm at most twice; when the different electronic billboards 10 generates the warning messages by the same image analysis method within a specific time period (such as one hour or two hours), the warning module 26 of the monitoring device 20 transmits the warning message or issue the alarm at most twice. Furthermore, a combination policy of outputting the warning message and/or alarm, an error prevention policy for the warning message and/or alarm, and/or alarm failure prompt for the warning message and/or alarm can be provided; however, these examples are merely for exemplary illustration, and the application field of the present invention is not limited to these examples.

The monitoring device 20 can record the electronic billboard 10 in a monitoring list, and when the area selection module 22 of the monitoring device 20 captures the to-be-analyzed image, the image analysis module 24 of the monitoring device 20 can directly use the pre-designated image analysis method to transform the to-be-analyzed image into the image characteristic according to the monitoring list, and then perform sequential processes; the detailed description is not repeated herein.

The above image analysis method can automatically realize the analysis operations in parallel based on the amount of image analysis operations to be performed at the same time, so as to ensure the real-time detection. The above captured monitoring images and to-be-analyzed images can be transmitted and processed together. The manner of issuing and receiving the message can apply Kafka technology, and the storage of messages apply the Postgres database and related technologies.

The operation of the method of the present invention will be described in the following paragraphs. Please refer to FIG. 6, which is a flowchart of a method of automatic monitoring an electronic billboard to immediately respond a production abnormality, according to the present invention.

Figure 6:
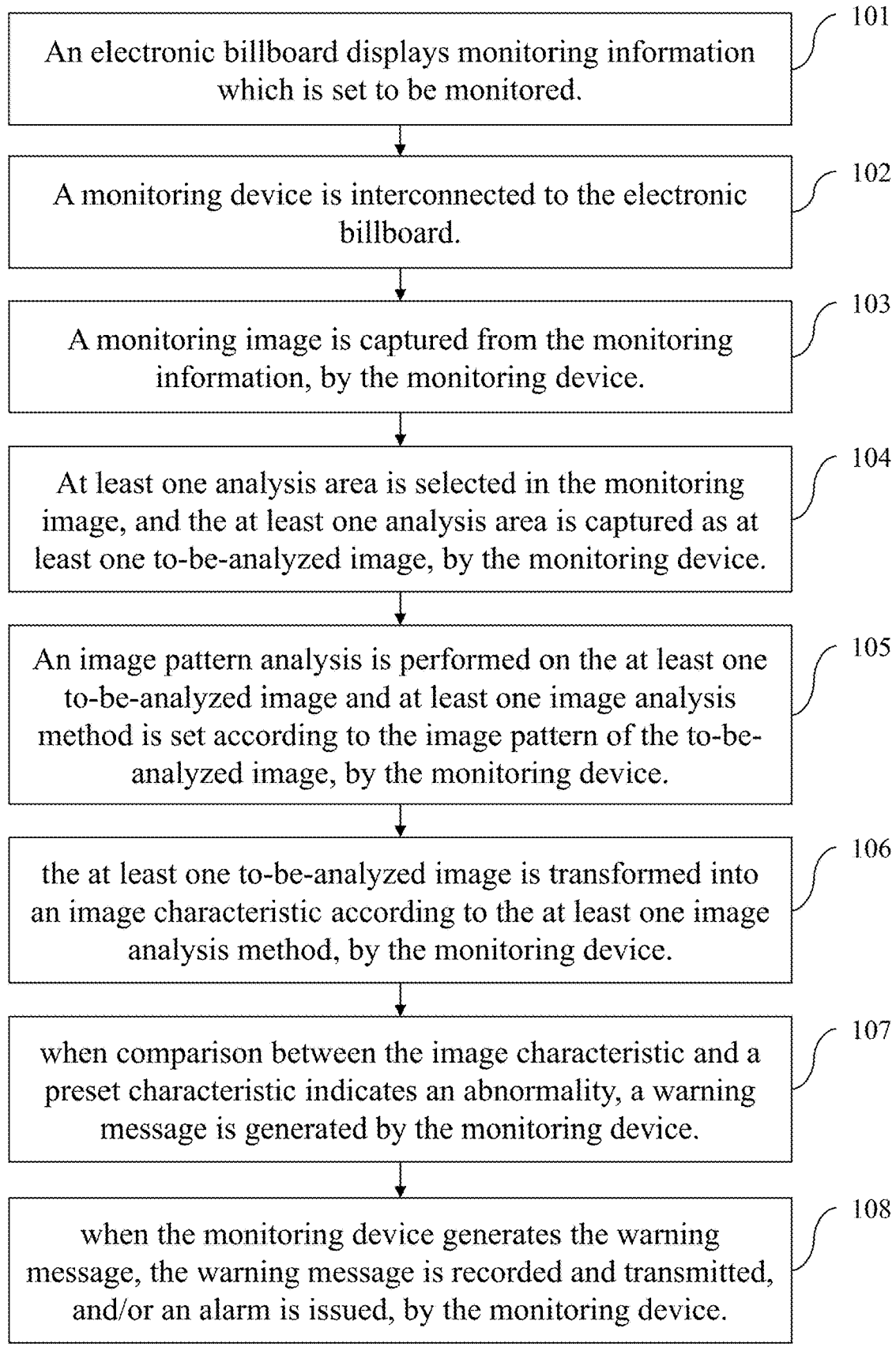
FIG. 6 is a flowchart of a method of automatically monitoring an electronic billboard to immediately respond a production abnormality, according to the present invention.

As shown in FIG. 6, the method of the present invention includes steps 101 to 108.

In a step 101, an electronic billboard displays monitoring information which is set to be monitored. In a step 102, a monitoring device is interconnected to the electronic billboard. In a step 103, a monitoring image is captured from the monitoring information, by the monitoring device. In a step 104, at least one analysis area is selected in the monitoring image, and the at least one analysis area is captured as at least one to-be-analyzed image, by the monitoring device. In a step 105, image pattern analysis is performed on the at least one to-be-analyzed image and at least one image analysis method is set according to the image pattern of the to-be-analyzed image, by the monitoring device. In a step 106, the at least one to-be-analyzed image is transformed into an image characteristic according to the at least one image analysis method, by the monitoring device. In a step 107, when comparison between the image characteristic and a preset characteristic indicates an abnormality, a warning message is generated by the monitoring device. In a step 108, when the monitoring device generates the warning message, the warning message is recorded and transmitted, and/or an alarm is issued, by the monitoring device.

Therefore, the difference between the present invention and the conventional technology is that, in the present invention, the monitoring device performs the image pattern analysis on the monitoring image to analyze the at least one analysis area, and captures the at least one analysis area as the to-be-analyzed image; the at least one image analysis method is set to transform the to-be-analyzed image into the image characteristic according to the image pattern of the to-be-analyzed image; when the comparison between the image characteristic and the preset characteristic indicates an abnormality, the monitoring device generates, records and transmits the warning message and/or issues the alarm.

Therefore, the above-mentioned solution of the present invention is able to solve the conventional technology problem that monitoring the electronic billboard manually is easy to cause misjudgments and omissions, so as to achieve the technical effect of automatically monitoring the electronic billboard and immediately responding a production abnormality.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method of automatic monitoring an electronic billboard to immediately respond a production abnormality, wherein the method is adapted to an electronic billboard displaying monitoring information and comprises:
    interconnecting a monitoring device to the electronic billboard;
    capturing a monitoring image from the monitoring information, by the monitoring device;
    performing an image pattern analysis on the monitoring image, and analyzing at least one analysis area corresponding to an image pattern in the monitoring image, and capturing the at least one analysis area as at least one to-be-analyzed image, by the monitoring device;
    setting at least one image analysis method according to the image pattern of the to-be-analyzed image, by the monitoring device;
    transforming the at least one to-be-analyzed image into an image characteristic according to the at least one image analysis method, by the monitoring device;
    transforming sample images of prebuilt categories into grayscale images;
    performing image characteristic calculation on the grayscale images, transformed from the sample images of the prebuilt categories;
    clustering image characteristics of the sample images of each of the categories;
    setting a cluster center of the image characteristics as a sample image prototype of each of the categories;
    calculating a distance from an image characteristic of the to-be-analyzed image to a selected one of the sample image prototypes of the categories, when the distance is lower than or equal to a preset threshold value, designating the image characteristic of the at least one to-be-analyzed image as belonging to the category corresponding to the selected sample image prototype;
    when comparison between the image characteristic and a preset characteristic indicates an abnormality, generating a warning message by the monitoring device; and
    when the monitoring device generates the warning message, recording the warning message, and transmitting the warning message and/or issuing an alarm, by the monitoring device.

2. The method according to claim 1, wherein the step of transforming the at least one to-be-analyzed image into the image characteristic according to the at least one image analysis method, by the monitoring device, comprises:
    performing similarity comparison on prebuilt abnormal templates and the at least one to-be-analyzed image in sequential order, and calculates the image characteristic of the to-be-analyzed image by means of mean square error (MSE).

3. The method according to claim 1, wherein the step of transforming the at least one to-be-analyzed image into the image characteristic according to the image analysis method by the monitoring device, comprises:
    transforming the at least one to-be-analyzed image into a grayscale image;
    calculating a ratio of an average grayscale value of the at least one to-be-analyzed image to a normal grayscale value or an abnormal grayscale value; and
    using the ratio as the image characteristic of the at least one to-be-analyzed image.

4. The method according to claim 1, wherein the step of transforming the at least one to-be-analyzed image into the image characteristic according to the image analysis method by the monitoring device, on the at least one to-be-analyzed image, comprises:
    transforming the at least one to-be-analyzed image into a grayscale image; and
    performing image characteristic calculation on the grayscale image, which is transformed from the at least one to-be-analyzed image, by means of histogram of oriented gradient (HOG).

\* \* \* \* \*